(12) United States Patent
Lin

(10) Patent No.: US 7,882,558 B1
(45) Date of Patent: *Feb. 1, 2011

(54) TUNNEL DESIGNATION SYSTEM FOR VIRTUAL PRIVATE NETWORKS

(75) Inventor: Yeejang James Lin, San Jose, CA (US)

(73) Assignee: WatchGuard Technologies, Inc., Seattle, WA (US)

(*) Notice: Subject to any disclaimer, the term of this patent is extended or adjusted under 35 U.S.C. 154(b) by 1066 days.

This patent is subject to a terminal disclaimer.

(21) Appl. No.: 11/542,680

(22) Filed: Oct. 2, 2006

Related U.S. Application Data

(63) Continuation of application No. 09/732,543, filed on Dec. 7, 2000, now Pat. No. 7,117,530.

(60) Provisional application No. 60/169,502, filed on Dec. 7, 1999.

(51) Int. Cl.
G06F 15/16 (2006.01)
G06F 17/00 (2006.01)

(52) U.S. Cl. ........................................... 726/15

(58) Field of Classification Search .................. 726/14, 726/15, 27
See application file for complete search history.

(56) References Cited

U.S. PATENT DOCUMENTS

| | | |
|---|---|---|
| 5,367,667 A | 11/1994 | Wahlquist et al. |
| 5,371,852 A | 12/1994 | Attanasio et al. |
| 5,473,599 A | 12/1995 | Li et al. |
| 5,574,720 A | 11/1996 | Lee |
| 5,781,549 A | 7/1998 | Dai |
| 5,848,233 A | 12/1998 | Radia et al. |
| 5,884,312 A | 3/1999 | Dustan et al. |
| 5,892,451 A | 4/1999 | May et al. |

(Continued)

OTHER PUBLICATIONS

Guo et al., "A Policy-based Network Management System for IP VPN," Proceedings of the International Conference on Communication Technology [ICCT], Apr. 9-11, 2003, vol. 2, pp. 1630-1633.

(Continued)

*Primary Examiner*—Kambiz Zand
*Assistant Examiner*—Aubrey H Wyszynski
(74) *Attorney, Agent, or Firm*—Kory D. Christensen; Stoel Rives LLP

(57) ABSTRACT

A system and method are provided to couple tunnel servers to tunnel clients executing host applications for use in a virtual private network (VPN) environment. A receiver receives requests from host applications executing on the tunnel clients. The requests are addressed to the tunnel coupling system to establish a VPN tunnel. A processor processes the requests and an indication of loads on the tunnel servers to establish the VPN tunnels by designating at least one of the tunnel servers to each requested tunnel. A tunnel traffic distributor distributes tunnel traffic to the tunnel servers based at least part on the designations. In additional aspects, an evaluation processor evaluates the tunnel traffic before the tunnel traffic distributor distributes the tunnel traffic to the tunnel servers. For example, the evaluation performed by the evaluation processor includes at least performing security functions on the tunnel traffic. In yet another aspect, the request processor establishes the VPN tunnel by, in part, associating each VPN tunnel with characteristics of tunnel traffic for that VPN tunnel, and the tunnel traffic distributor operates in part based on the associations, without involvement of the host applications.

5 Claims, 2 Drawing Sheets

U.S. PATENT DOCUMENTS

| | | |
|---|---|---|
| 6,006,259 A | 12/1999 | Adelman et al. |
| 6,081,508 A | 6/2000 | West et al. |
| 6,101,543 A | 8/2000 | Alden et al. |
| 6,157,955 A | 12/2000 | Narad et al. |
| 6,167,047 A | 12/2000 | Welfeld |
| 6,173,399 B1 | 1/2001 | Gilbrech |
| 6,208,640 B1 | 3/2001 | Spell et al. |
| 6,208,655 B1 | 3/2001 | Hodgins et al. |
| 6,226,748 B1 | 5/2001 | Bots et al. |
| 6,226,751 B1 | 5/2001 | Arrow et al. |
| 6,538,996 B1 | 3/2003 | West et al. |
| 6,542,508 B1 | 4/2003 | Lin |
| 6,615,383 B1 | 9/2003 | Talluri et al. |
| 6,636,898 B1 * | 10/2003 | Ludovici et al. ............ 709/250 |
| 6,701,437 B1 | 3/2004 | Hoke et al. |
| 6,704,282 B1 * | 3/2004 | Sun et al. .................... 370/237 |
| 6,732,314 B1 | 5/2004 | Borella et al. |
| 7,117,530 B1 | 10/2006 | Lin |

OTHER PUBLICATIONS

Hamchaoui et al., "Resource Management in Virtual Private Networks over ATM," Proceedings of 1997 IEEE ATM Workshop, May 25-28, pp. 659-668.

* cited by examiner

TUNNEL DESIGNATION SYSTEM FOR VIRTUAL PRIVATE NETWORKS

RELATED APPLICATIONS

This application is a continuation of U.S. patent application Ser. No. 09/732,543 filed Dec. 7, 2000 now U.S. Pat. No. 7,117,530, which claims priority to U.S. provisional patent application No. 60/169,502 filed Dec. 7, 1999 and entitled "VPN Tunnel Balancer" both of which are incorporated herein by reference.

TECHNICAL FIELD

The present application is in the field of Virtual Private Networks and, in particular, is directed to a secure tunnel "handler" that acts as a gateway for establishment of tunnels by tunnel clients.

BACKGROUND

Virtual Private Network (VPN) has emerged as a key technology to transport private data over public network infrastructure. VPN has two major components—tunnel technology and security management.

At least two groups of tunnel technologies are available today to encapsulate private data in a format for transportation over a public network such as the Internet. One group of tunnel technologies provides tunnel services at Layer 2 of the OSI network model. ("OSI" is Open System Interconnection.) Point-to-Point Tunnel Protocol (PPTP), Layer 2 Tunnel Protocol (L2TP), and Layer 2 Forwarding (L2F) belongs to the first group. Another group of tunnel technologies provides tunnel services at Layer 3 of the OSI network model. For example, IPSEC (IP Security Protocol) is one of most popular layer-3 tunnel technologies of the second group of tunnel technologies.

Layer 2-type tunnel technologies make use of the existing PPP features to perform authentication and addressing and are preferred for remote access applications to support remote users as shown in FIG. 1. In FIG. 1, Remote user A 102 is a tunnel client who establishes a tunnel (Tunnel 1 104) to Tunnel Server A 106 after being authenticated by the Authentication Server A 108. (A "tunnel server" is a tunnel terminator that terminates a tunnel and forwards traffic within the tunnel to respective "end systems".) Remote User B 112 uses an Access Concentrator 114 which acts a tunnel client to establish a tunnel (Tunnel 2 116) between Tunnel Server A 106 and Access Concentrator 114 after Remote User B 112 is authenticated by Authentication Server B 118 (and the credential of Remote User B 112 is passed by Access Concentrator 114 and authenticated by Authentication Server A 108). Another kind of tunnel connectivity is a "between site-to-site tunnel" (Tunnel 3 122 in FIG. 1) which is established between Tunnel Server B 124 and Tunnel Server A 106.

As VPN technology becomes more widespread, more VPN enabled networks are constructed and more applications utilize VPN (for example, for telecommuting, extranets and intranets). As a result, it becomes desirable to have the ability to "scale up" tunnel servers to support a larger number of clients and remote users securely and reliably. While "load balancers" exist conventionally, such load balancers handle a group of tunnel servers but do not keep track of tunnel connections or even understand the tunnel protocols. Furthermore, it is desirable that the VPN's be reliably available by, for example, providing a failover and/or backup mechanism and be able to operate at very high speed. In addition, security (e.g., firewall) is desirably provided to protect data from unauthorized access. As discussed above, many conventional tunnel servers implement IPSEC protocol. However, IPSEC is a very time consuming operation and requires a large amount of processing time from tunnel servers, thus limiting the number of VPN client that can be supported by such tunnel servers.

SUMMARY

In accordance with the invention, a system and method are provided to couple tunnel servers to tunnel clients executing host applications for use in a virtual private network (VPN) environment. A receiver receives requests from host applications executing on the tunnel clients. The requests are addressed to the tunnel coupling system to establish a VPN tunnel. A processor processes the requests and an indication of loads on the tunnel servers to establish the VPN tunnels by designating at least one of the tunnel servers to each requested tunnel. A tunnel traffic distributor distributes tunnel traffic to the tunnel servers based at least part on the designations.

In additional aspects, an evaluation processor evaluates the tunnel traffic before the tunnel traffic distributor distributes the tunnel traffic to the tunnel servers. For example, the evaluation performed by the evaluation processor includes at least performing security functions on the tunnel traffic.

In yet another aspect, the request processor establishes the VPN tunnel by, in part, associating each VPN tunnel with characteristics of tunnel traffic for that VPN tunnel, and the tunnel traffic distributor operates in part based on the associations, without involvement of the host applications.

DETAILED DESCRIPTION

Figure 2:
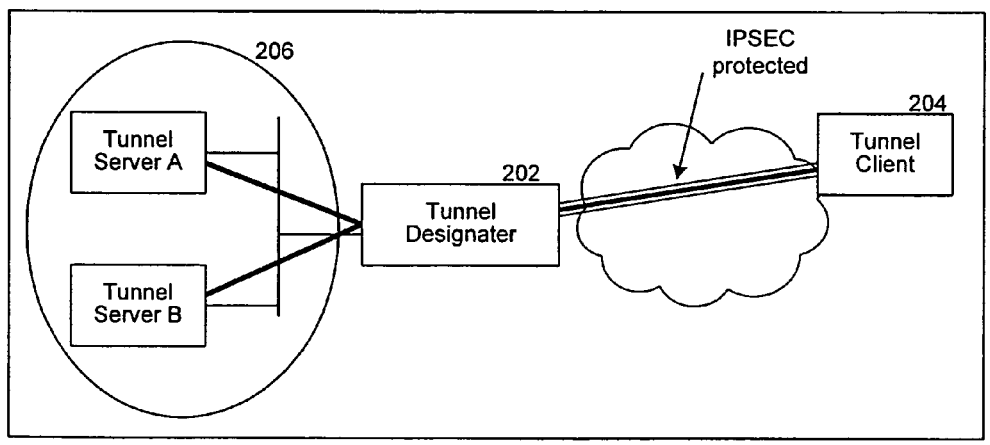
FIG. 2 illustrates a VPN tunneling configuration in accordance with an embodiment of the invention.

To address the above problems, a tunnel designator in accordance with the invention provides a secure, scalable and reliable VPN tunnel implementation. FIG. 2 illustrates a system 200, in accordance with an embodiment of the invention, employing a tunnel designator 202. The external IP address of the tunnel designator 202 is the well-known IP address of tunnel servers for external networks—a virtual IP address for all tunnel servers. As a tunnel client 204 attempts to establish a tunnel with a tunnel server, it sends a tunnel establishment request to the tunnel designator 202, which acts as a "virtual" tunnel server. That is, the tunnel designator 202 appears to the tunnel client 204 to be itself a tunnel endpoint. The tunnel designator 202 then designates requests to tunnel servers of a tunnel server farm 206. Such designation may be, for example, in accordance with a "load balance" algorithm.

Figure 1:
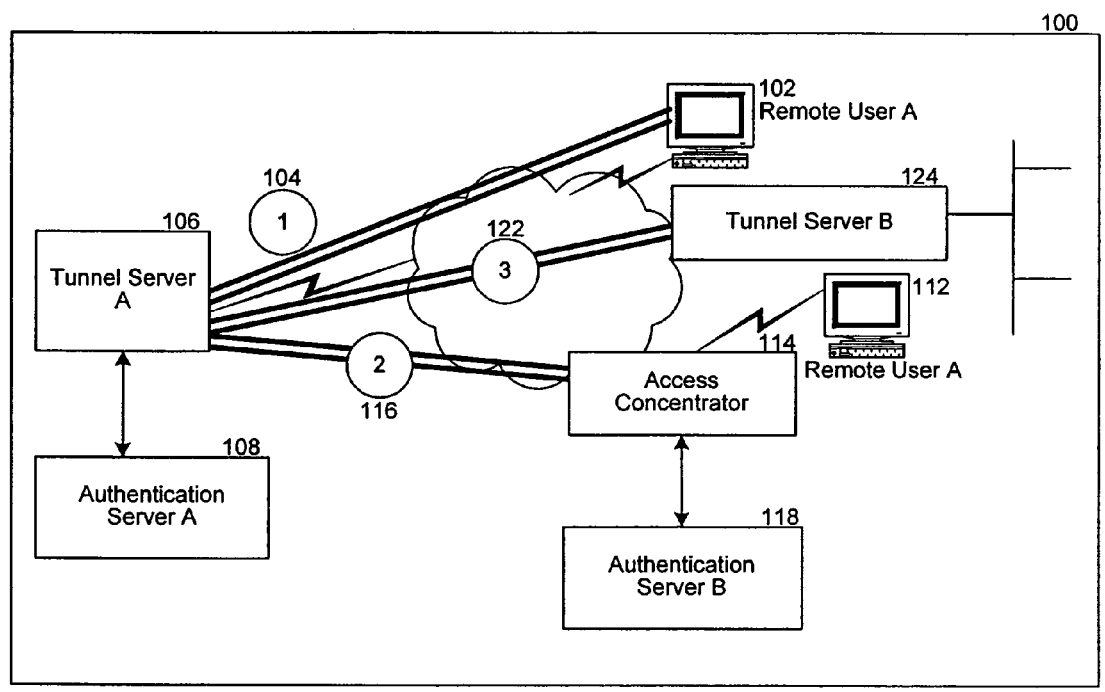
FIG. 1 illustrates a conventional VPN tunneling configuration.
Figure 3:
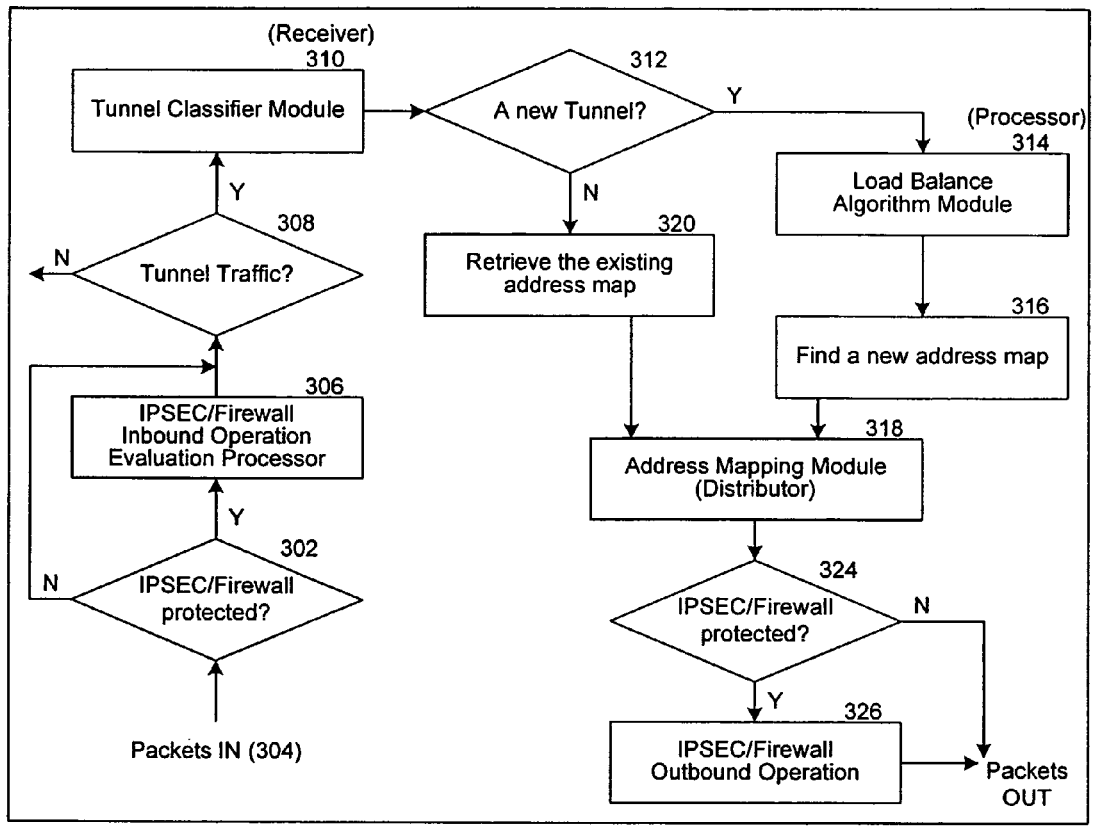
FIG. 3 illustrates the FIG. 2 system in a hybrid functional/structural manner.

FIG. 3 illustrates the components of the system 200 (including the designator 202) in a hybrid structural/functional manner. First, at block 302, it is determined if incoming packets 304 are IPSEC/Firewall protected. If so, block 306 carries out an IPSEC/Firewall inbound operation. Then, at block 308, it is determined if the incoming packets 304 are tunnel traffic. If not, then the designator 202 does not operate on the incoming packets 304. If the incoming packets are tunnel traffic, then the tunnel classifier module 310 operates on the incoming packets 304.

If it is determined that the incoming packets 304 are for a new tunnel (block 312), then a load balance algorithm module 314 is activated to determine which tunnel server of the tunnel server farm 206 is appropriate to handle the newly-requested tunnel. While this description is in terms of a "load balance algorithm", it is within the scope of the invention to employ various tunnel "determination" algorithms. Examples of algorithms that may be utilized are round robin, weighted round robin, least recent use, and least system load. In accordance with the results of the load balance algorithm 314, a new address map is found (316).

Otherwise, if it is determined that the incoming packets 304 are not for a new tunnel (block 312), then the existing address map is retrieved (block 320). In any event (whether a new address map is found or an existing address map is retrieved), the address mapping module 318 maps the incoming data packets 304 to a tunnel server of the tunnel server farm 206 in accordance with the address map. The address map uses a Network Address Translation to map between the external IP address of the tunnel designator 202 and the IP addresses of the tunnel servers of the tunnel server farm 206.

It should be noted that the decisions (e.g., in blocks 302, 308, 312 and 324) can be cached and then, after the tunnel is established, a "fast path" can be taken via hardware with minimal (or no) host software application intervention. That is, as discussed above, the tunnel designator 202 "understands" VPN protocols and monitors traffic to approve or disapprove VPN traffic according to security policies. Upon approval of a new VPN connection, the tunnel designator 202 assigns the connection to a tunnel server and caches appropriate information in the "connection table" for handling subsequent traffic through the connection. Such a cache mechanism is described in U.S. patent application Ser. No. 09/465,123 filed Dec. 16, 1999, hereby incorporated by reference in its entirety.

In use of the system illustrated by FIGS. 2 and 3, the tunnel designator 202 supports IPSEC security services such as data integrity and end system authentication to protect data in transit, offloading such "compute intensive" security processes transparently by protecting/monitoring data in transit before providing the data to the tunnel servers. In addition, the tunnel designator 202 monitors traffic between the tunnel clients and corresponding tunnel servers and, based on this monitoring, detects (non-intrusively) if a server goes down or comes back on. Such monitoring is carried out non-intrusively.

Thus, this embodiment provides an integrated solution to:
support various tunnel protocols such as L2TP, PPTP, etc.;
load balance many tunnel servers for scalability and high availability;
provide high speed security services to secure data in transit; and
provide high speed firewall services to block unwanted traffic.

An example is now set forth. In this example, L2TP (Layer 2 Tunnel Protocol) is used to illustrate how the tunnel designator 202 may operate. In accordance with the example, a "virtual" L2TP tunnel server (corresponding to the tunnel designator 202 of FIG. 2, for example) registers an IP address as the IP address of the tunnel server. An L2TP tunnel client with IP address Ci and port Pi requests connection to the well-known UDP port 1701 of an L2TP server with an IP address Sr. The server chooses an available port Pr and connects back to the L2TP client at port Pi. The connection (Ci, Pi, Sr, Pr) should be classified as L2TP traffic.

For this example, it is assumed that Ci is "192.128.10.5" and Sr is "200.200.100.1". In the tunnel server farm, there are two tunnel servers, with addresses "10.10.1.1" and "10.10.1.2".

The following table illustrates a mapping between the tunnel designator 202 and tunnel servers of the tunnel server farm 206.

| Virtual IP address | Port | Real IP address | port | weight | algorithm |
|---|---|---|---|---|---|
| 200.200.100.1 | 1701 | 10.10.1.1 | 1701 | 1 | Weighted round robin |
|  |  | 10.10.1.2 | 1701 | 2 |  |

For the example, it should be assumed that a weighted round robin algorithm is in use to select a tunnel server (and that 10.10.1.2 is selected) from the tunnel server farm 206. During the set up of a new tunnel, the selected tunnel server chooses an available port Pr, connects back to the client via chosen port Pi, and then updates the mapping table shown below:

| packet | SrcIP | port | dstIP | dstPort |
|---|---|---|---|---|
| incoming | 192.128.10.5 | Pi | 10.10.1.2 | Pr |
| outgoing | 10.10.1.2 | Pr | 192.128.10.5 | Pi |

After a tunnel is established, the tunnel designator forwards subsequent traffic of the same tunnel to the designated tunnel server according to the mapping table.

What is claimed is:

1. A tunnel designator to couple tunnel servers to tunnel clients executing host applications for use in a virtual private network (VPN) environment, comprising:
   (a) a receiver that receives tunnel traffic from host applications executing on the tunnel clients, the tunnel traffic comprising traffic related to existing VPN tunnels and requests to establish a VPN tunnel;
   (b) a processor that processes the requests, the processor also maintaining an indication of loads on the tunnel servers, the processor operative to establish
   the VPN tunnels by designating at least one of the tunnel servers to each of the requests; and
   (c) a tunnel traffic distributor that distributes the tunnel traffic related to existing VPN tunnels to the tunnel servers based at least part on the designations.

2. The tunnel designator of claim 1, further comprising:
   an evaluation processor that evaluates the tunnel traffic before the traffic distributor distributes the tunnel traffic to the tunnel servers.

3. The tunnel designator of claim 2, wherein the evaluation performed by the evaluation processor includes at least performing security functions on the tunnel traffic.

4. The tunnel designator of claim 1, wherein:
   the processor establishes the VPN tunnel with characteristics of tunnel traffic for that VPN tunnel; and
   the tunnel traffic distributor operates in part based on the associations, without involvement of the host applications.

5. A method of connecting a plurality of tunnel clients to a plurality of tunnel servers using a tunnel designator, the method comprising:
  using said tunnel designator to receive tunnel traffic of one or more of said tunnel clients, said tunnel traffic comprising traffic related to existing VPN tunnels;
  identifying in said tunnel traffic, a request from one of said tunnel clients;
  determining if said request is a valid request from one of said tunnel clients;
  determining if said request is for a new tunnel, and if so:
  (a) opening a new tunnel to a selected one of said tunnel servers; and
  (b) modifying an address map to include information associating said selected one of said tunnel servers to said request;
  if not:
  (b) using said address map to route said request to a mapped tunnel server.

* * * * *